G. A. H. KELLNER.
RELAYING PROJECTION APPARATUS.
APPLICATION FILED OCT. 23, 1909.

984,929.

Patented Feb. 21, 1911.

G. A. H. KELLNER.
RELAYING PROJECTION APPARATUS.
APPLICATION FILED OCT. 23, 1909.

984,929.

Patented Feb. 21, 1911.
2 SHEETS—SHEET 2.

Witnesses

Inventor

Attorneys

UNITED STATES PATENT OFFICE.

GUSTAV A. HERMANN KELLNER, OF ROCHESTER, NEW YORK, ASSIGNOR TO BAUSCH & LOMB OPTICAL COMPANY, OF ROCHESTER, NEW YORK, A CORPORATION OF NEW YORK.

RELAYING PROJECTION APPARATUS.

984,929.

Specification of Letters Patent. Patented Feb. 21, 1911.

Application filed October 23, 1909. Serial No. 524,188.

*To all whom it may concern:*

Be it known that I, GUSTAV A. HERMANN KELLNER, a subject of the King of Prussia, and resident of Rochester, in the county of Monroe and State of New York, have invented certain new and useful Improvements in Relaying Projection Apparatus; and I do hereby declare the following to be a full, clear, and exact description of the same, reference being had to the accompanying drawings, forming a part of the specification, and to the reference-numerals marked thereon.

My present invention provides an optical apparatus for projecting the image of an object to a remote point by means of a system of lenses in which the glasses themselves are comparatively small in diameter and it comprehends an arrangement of lenses such that the image projected may be fully illuminated and its area maintained practically equal to the object itself as distinguished from the enlargements or magnifications usually obtained in projections.

My invention also has for its object to provide means for relaying the image of an object to be projected and the image of the light source by which it is illuminated so that it may be projected a considerable distance and if desired the rays of light may be bent or deflected permitting the projection to be carried around corners and the image observed at a point out of alinement with as well as at a point remote from the object.

A further object included in my present invention is the application of a lens system possessing the capabilities above mentioned to the projection of the readings or graduations of the rose of a ship's compass and this feature of the invention also includes certain improvements in the arrangement of the graduations of the compass rose whereby two or more duplicate readings of the compass may be transmitted to different parts of the ship or vessel.

To these and other ends the invention consists in certain improvements and combinations of parts all as will be hereinafter more fully described, the novel features being pointed out in the claims at the end of the specification.

Figure 1:
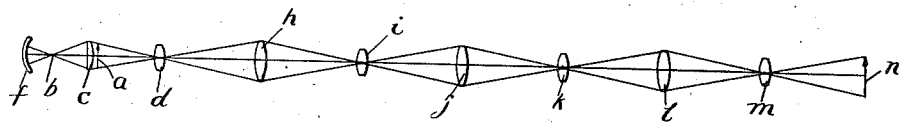
Figure 2:
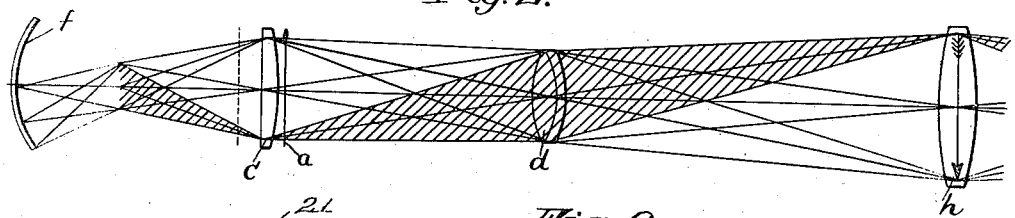
Figure 6:
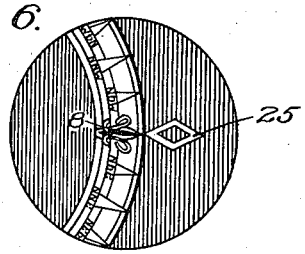
Figure 3:
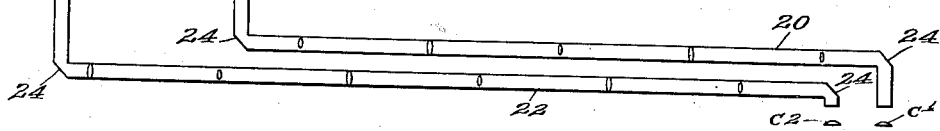
Figure 7:
Figure 4:
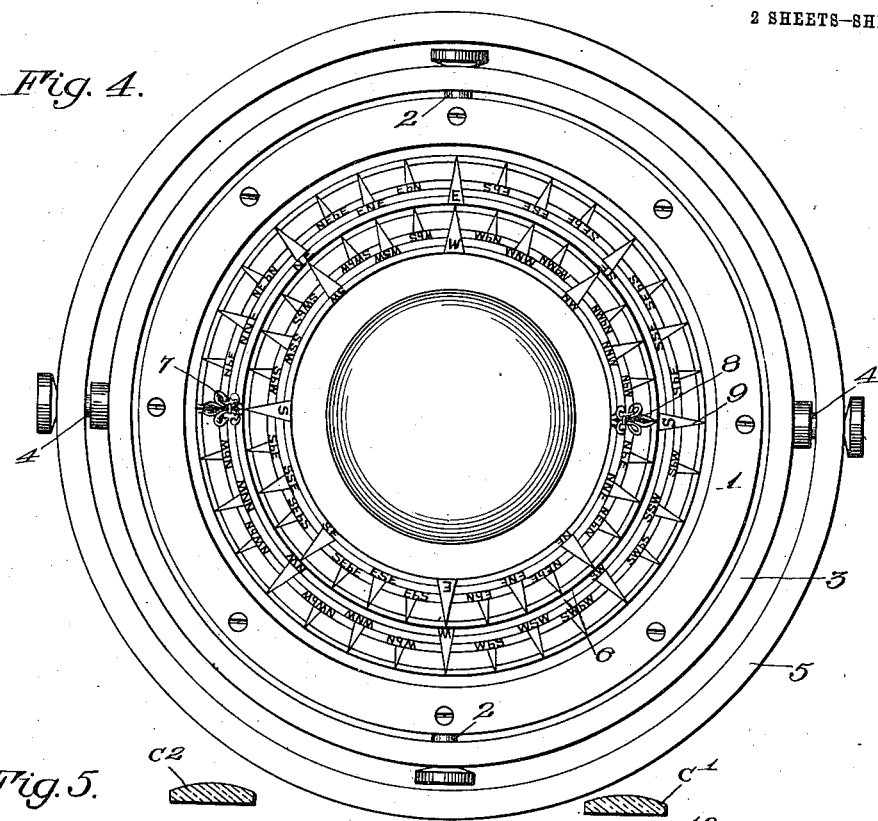
Figure 5:
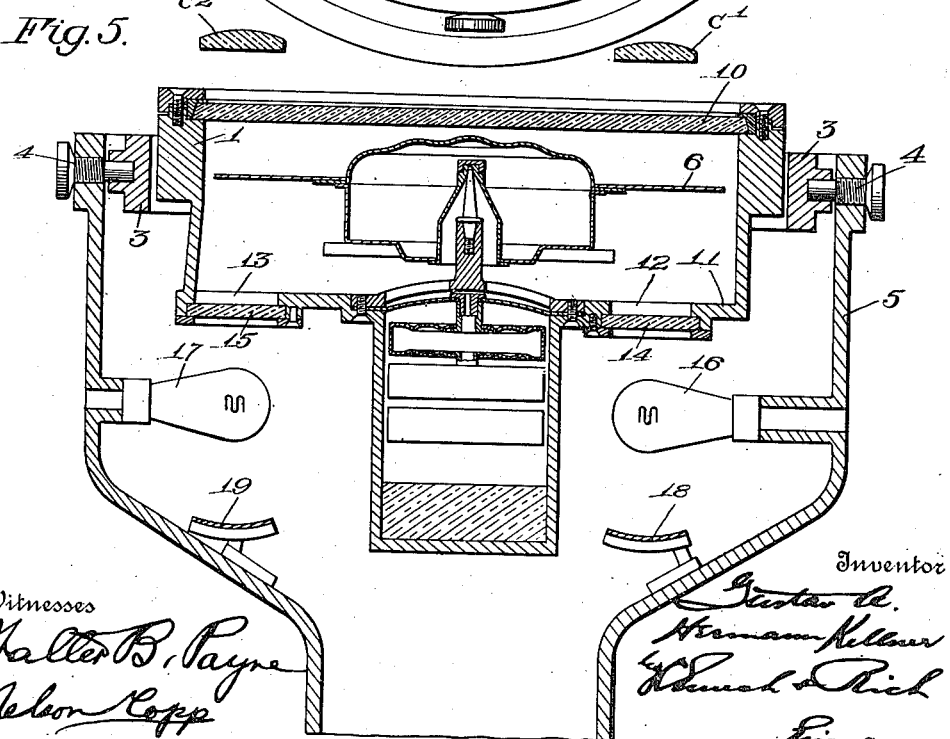

In the drawings: Figure 1 is a diagrammatic illustration of a lens system arranged in accordance with my invention. Fig. 2 is a similar enlarged view. Fig. 3 is a detail diagrammatic view illustrating one embodiment of the invention as applied for projecting the readings of a ship's compass. Fig. 4 is a plan view of a ship's compass showing the rose arranged for double readings. Fig. 5 is a central vertical sectional view of the compass. Fig. 6 is a detail plan view of a focusing screen, and Fig. 7 is a diagrammatic view of the lamp filament.

Similar reference numerals in the several figures indicate similar parts.

In carrying out my present invention I employ a primary projecting lens and a plurality of lenses arranged relatively thereto in sets and adapted to coöperate with the primary projecting lens in such a way that the projected image is relayed or carried along from one set of lenses to the next, said sets of lenses also being adapted and so proportioned one to the other that the source of light is likewise relayed or carried along and illuminates the image giving the latter full brilliancy on the focusing screen located at the end of the lens system.

In Fig. 1 is shown a diagrammatic arrangement of a lens system embodying my invention in which *a* indicates an object to be projected, *b* a source of light for illuminating it and *c* a condenser which focuses the image of the light source in a primary projecting lens *d*. The preferred means of illuminating the object is by means of an incandescent lamp and in order to amplify the illumination a lamp having a filament comprising a plurality of loops or light emitting strands *e*, as shown in Fig. 7, is employed. The illuminating power of the lamp may be increased by employing a concave reflector *f* which in conjunction with the lamp or light source is positioned to throw a reflected image of the strands of the lamp filament or frame in the same plane as the light source and at one side of the light source proper, as shown by the dotted lines in Fig. 7. The advantage of this arrangement will be at once appreciated as the effectiveness or strength of the source of light is greatly increased, the illuminating power of a lamp filament of five strands being nearly doubled in strength by the five offset reflections obtained by a proper focusing of the reflector. In practice this is accomplished by arranging a concave spherical mirror in the axis of the lens system and adjusting the light source slightly at one side of said axis so that it with its reflected image will be symmetrical to said axis. The primary lens $d$ has a given focal length and is positioned relatively to the object to project an image thereof of given area at a previously determined distance the focal length of this lens, as well as of the other lens coöperating therewith, which will be further described, being established by the conditions the apparatus is required to fulfil. The primary lens $d$ produces an inverted image of the object $a$ but instead of locating a screen in the plane of the image to portray the image a collective lens $h$ is stationed which focuses the image formed by the primary projection lens $d$ into a secondary projection lens $i$. In other words, the collective lens $h$ gathers or concentrates the cone of light from the primary projecting lens $d$ into the secondary projection lens $i$, and as the image of the light source was focused in the former the image projected by it is reproduced in the latter to be again projected, this second projection of the image showing the object erected. The collective lens $h$ and secondary projecting lens $i$ are, for convenience in description, designated as a set of lenses and to continue the projection still farther other projection sets of collective and projecting lenses, as indicated by $j$ and $k$ and $l$ and $m$, respectively, may be employed, the number of such sets being only dependent upon the candle power of the illuminant and the absorption of light in the lenses themselves. At the end of the lens system in focus with the last projecting lens is located a screen (indicated by $n$ Fig. 1) upon which the image of the object is exhibited and in a lens system, such as illustrated in Fig. 1, comprising three sets of glasses the image of the object shown will be erect.

From the foregoing it will be seen that the image finally viewed upon the screen is the result of a relaying of the original image of the object thrown forward by the primary projecting lens and that it is rendered distinguishable upon the screen by the light or illumination carried along with the image by relaying or repeating the image of the light source. Each projecting lens is in a plane where the repeated image of the source appears and each collective lens is at a point where the image of the object is focused, i. e., the corresponding lens of the successive sets are arranged relatively, each end the conjugate foci of the other.

In the drawings I have shown one use to which the above described apparatus may be put in conjunction with other features of my invention. This is its adaptation to use on board a ship for projecting the readings of the compass and by a novel arrangement of the compass rose and its casing I am enabled to project a plurality of duplicate compass readings to various parts of a ship for simultaneous observations by different officers. The projecting apparatus embodying my invention possess a particular and distinctive advantage in this connection as it enables the compass to be located below decks, even in the hold of the vessel where it is the least subjected to the rocking movement of the ship, while the readings may be carried to the pilot house or bridge. Such a location of the compass is particularly advantageous on battle ships as the compass may be located well below the water line and protected from injury and the duplicate readings thereof may be projected upwardly to the conning tower and to the central station as will be understood.

In Figs. 4 and 5 I have illustrated a compass mechanism, adapted particularly to be used with a projecting apparatus such as described, comprising the bowl 1, suspended by the pivots 2 in the gimbal ring 3, which in turn is suspended on the pivots 4 in the pedestal of the binnacle 5. Within the bowl is journaled the floating rose 6 which is preferably constructed of transparent material containing the usual direction graduations. The latter are, of course, arranged in circular order, and when it is desired to project duplicate readings I also provide the rose with two or more rows of duplicate graduations, the cardinal points of one row being displaced in relation to the corresponding points of the other row, and when but two rows of graduations are used I prefer to arrange the corresponding points in one in opposition to the other, as shown in Fig. 4, in which it will be seen that the north point of the outer row of graduations indicated by 7 is located at the left hand side of the figure, while the same graduation mark of the inner row is located at the right hand side, as indicated by 8, and consequently points in the direction of the south point 9 of the outer row.

The compass bowl 1 is closed by the glass cover 10, and may also be provided with a glass bottom, although I prefer to perforate the usual bottom 11, as indicated at 12 and 13, and close said perforations with glasses 14 and 15, the diameter of which will be determined by that portion of the rose which it is desired to project. The centers of these glasses 14 and 15 it will be noticed are arranged respectively beneath the inner and outer rows of direction graduations.

At opposite sides of the binnacle 5 beneath the bottom of the bowl, are arranged incandescent lamps 16 and 17, constituting the sources of light for the lens systems. These lamps, it will be noticed, are so positioned that the strands of their filaments are positioned in alinement with the centers of the windows 14 and 15, and beneath each of them is arranged the reflectors 18 and 19, corresponding to and performing the function attributed to the reflector $f$, before described.

Situated above the compass bowl and spaced a sufficient distance therefrom to permit it to rock in all directions, are the condensers $c'$ and $c^2$ which are in alinement with the apertures 12 and 13 in the bottom of the bowl, and while these lenses have been shown arranged exteriorly of the latter, it will be understood that they may be otherwise positioned in respect to the compass rose, which is the real object to be projected. In Fig. 3 a system of lenses indicated by 20 is shown arranged in conjunction with the condenser $c'$ for projecting the graduations appearing in the inner row of the compass rose to a screen 21 located at some remote point from the compass as, for instance, within the pilot house or the conning tower of a battle ship, a similar set of lenses indicated by 22 operate in conjunction with the condenser $c^2$ for projecting the graduations of the outer row to a screen 23, which may be located at some other convenient point of the ship, for instance within the so called central station of a battle ship. The two systems of lenses indicated by 20 and 22 operate to relay the image of the compass rose 6 and the sources of light 16 and 17 by successive projections of both precisely in the manner described in conjunction with Figs. 1 and 2, but as the focusing screens 21 and 23 are arranged out of alinement with the compass, reflectors 24 are arranged at suitable points between the lenses for deflecting the light rays. These reflectors may, it will be understood, be otherwise arranged and a greater number of them may be employed if circumstances require it. A plan view of one of the screens is illustrated in Fig. 6, and in this view is also shown a reproduction of the image of the compass rose. As the latter occupies a position on the screen identical with the position of the portion of the rose the navigating point indicated by 25 is placed in a proper position on said screen, and being stationary thereon the image of the rose appears to revolve bringing all the direction graduations of the entire rose into the same relation with said index as they normally bear to the navigating index on the bowl of the compass. After the apparatus has been erected and the lens system properly adjusted the screen is either provided with suitable diaphragms or a portion thereof is rendered opaque so that only the portion of the image desired is observed upon the screen, the whole appearing as shown in Fig. 6.

While it is not essential to the proper operation of the apparatus I prefer, however, to inclose the lens system in a tubular casing, which for convenience may be made in sections permitting access to the various lenses, these tubes while protecting the lenses from injury, also prevent the interception of the rays of light in any manner.

The projecting apparatus embodying my invention may be put to various uses other than the one described, and another adaptation which will be readily appreciated is the optical connection which the instrument will afford between two departments of a banking house for conveying certain information, such as a depositor's signature from the bookkeeper's department to the cashier's desk. These stations may be widely separated and between them will be located the lens system of the projecting apparatus, so that when the cashier wishes to familiarize himself with the signature of a particular depositor, for comparison with the signature of a check presented to him for payment, or any other reason, the bookkeeper or other officer when informed of the fact will place the usual signature card in proper position, whereupon the image of the signature will be projected upon the screen at the end of the lens system wherever it may be located.

I claim as my invention:

1. A projecting apparatus for producing an image of an object at a point remote therefrom, comprising a source of light, a plurality of sets of lenses arranged successively each set embodying lenses for relaying the image of the object and the source of light.

2. A projecting apparatus for producing an image of an object at a point remote therefrom, comprising a source of light, and a plurality of projecting and collective lenses disposed relatively and alternately relaying images of the light source and object.

3. An apparatus for producing an illuminated image of an object at a point remote therefrom, comprising a source of light, a focusing screen and a plurality of alternately disposed projecting and collective lenses disposed relatively to each other and relaying the image of the object with the image of the light source to produce an illuminated image of said object on the screen.

4. An apparatus for producing an illuminated image of an object at a point remote therefrom, comprising a source of light, a lens system embodying a plurality of sets of projecting and collective lenses arranged successively for the purpose of successively transmitting the image of the object and the rays of light illuminating it and a focusing screen located at the end of the lens system.

5. A lens system for a projection apparatus comprising two sets of projecting and collective lenses, the second set being disposed relatively to the first and adapted to effect a relaying projection of images of objects produced by the first set of lenses.

6. A projecting apparatus embodying a system of lenses comprising a primary projecting lens, a secondary projecting lens, a collective lens located between them and focusing the former into the latter and a focusing screen arranged relatively to the secondary projecting lens.

7. A projecting apparatus embodying a plurality of projecting lenses spaced apart, collective lenses located between adjacent projecting lenses and focusing the light rays emitted from one into the other and a focusing screen receiving the light rays emitted by the last projecting lens.

8. A projecting apparatus embodying a source of light, an object illuminated thereby, a primary projecting lens, a condensing lens focusing the image of the light source into said projecting lens, a second projecting lens, a collective lens gathering the cone of light emitted from the primary projecting lens and imaging said lens in the secondary projecting lens and a focusing screen arranged at the end of the lens system and receiving the image of the projected object illuminated by the light source.

9. The combination with a lens for projecting the image of an object, and a collective lens receiving and determining the area of said image, of a similar pair of lenses for relaying said image, another projecting lens for further projecting said image and a focusing screen receiving the latter.

10. The combination with a projecting lens and a collective lens for receiving the projected image of an object, of a plurality of additional lenses for relaying the said image and a focusing screen at the end of the lens system.

11. The combination with a lens for projecting the image of an object, of a plurality of additional coöperating lenses for relaying the projected image and a focusing screen at the end of the lens system.

12. The combination with an object, a source of light, a lens for projecting the image of said object and a condensing lens focusing the light source upon the projecting lens, of a plurality of coöperating lenses arranged to reproduce said image in a field of predetermined area and relay it to a point remote from the object and a focusing screen at the end of the lens system receiving the image of the object illuminated by the light source.

13. The combination with a compass rose, having a plurality of rows of similar direction graduations, of a plurality of focusing screens and separate sets of lenses, projecting images of similar portions of each row of graduations on the several screens.

14. The combination with a compass rose having inner and outer rows of graduations, the graduations of one row being disposed in opposition to those of the other row, of focusing screens and means for projecting the readings of said separate graduations on the screens.

15. The combination with a compass rose having separate rows of direction graduations, those of one row being arranged in opposition to those of the other, of separate focusing screens and means for projecting images of corresponding parts of said rows of graduations on the screens to show duplicate compass readings.

16. An apparatus for use on board ship comprising a compass having a rose, a focusing screen located at a point removed from the compass and provided with a navigating index, and means for projecting an image of a portion of the rose on said screen in coöperative relation to said index.

17. The combination with a ship's compass, of an apparatus for projecting the image of the compass rose and a focusing screen receiving said image and having a translucent portion upon which the image graduations of the rose may be observed and provided with a navigating index coöperating with the image graduations.

18. The combination with a ship's compass comprising a bowl having a bottom provided with transparent portions and having a transparent rose, of a support for the bowl, a source of light located beneath it, and a lens system for relaying projections of the image of the light source and rose and a focusing screen at the end of the lens system.

19. In a projection apparatus, the combination with an object to be projected, a source of light located at one side thereof and a projecting lens system arranged at the other side, of a reflector intensifying the effectiveness of the light, the latter being so positioned in respect to the reflector that the reflection thereof falls at one side of said light source.

20. The combination with a ship's compass comprising a bowl provided with a transparent bottom and having a transparent rose, of an incandescent lamp mounted beneath the bowl having a filament arranged in a plurality of strands and a reflector located beneath the lamp, the latter being so positioned that the reflected image of the strands is formed in the plane of the strands and at one side of said strands.

GUSTAV A. HERMANN KELLNER.

Witnesses:
G. WILLARD RICH,
HENRY W. HALL.